(No Model.) 2 Sheets—Sheet 2.
J. G. STOWE.
HAY CARRIER.
No. 463,876. Patented Nov. 24, 1891.
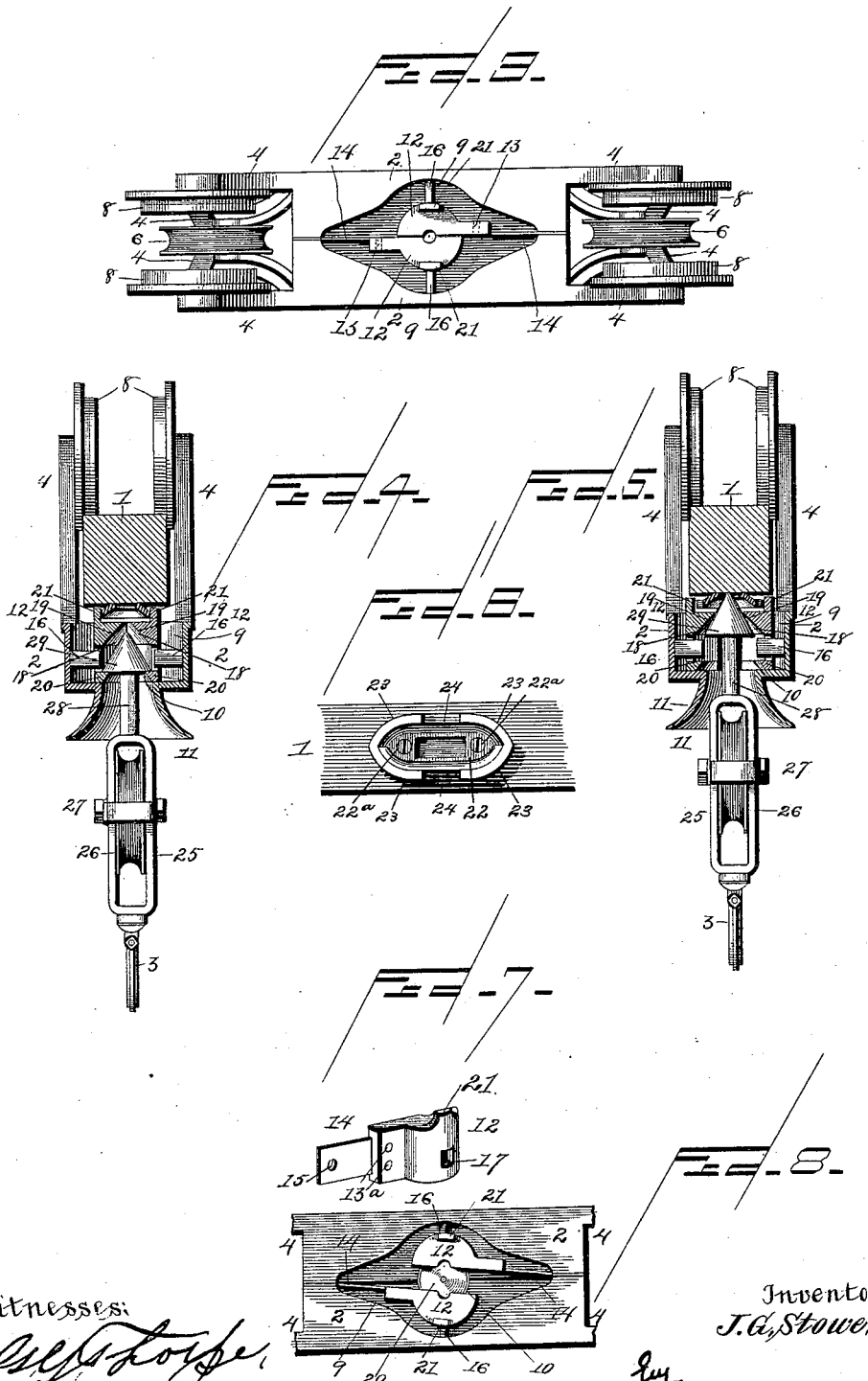

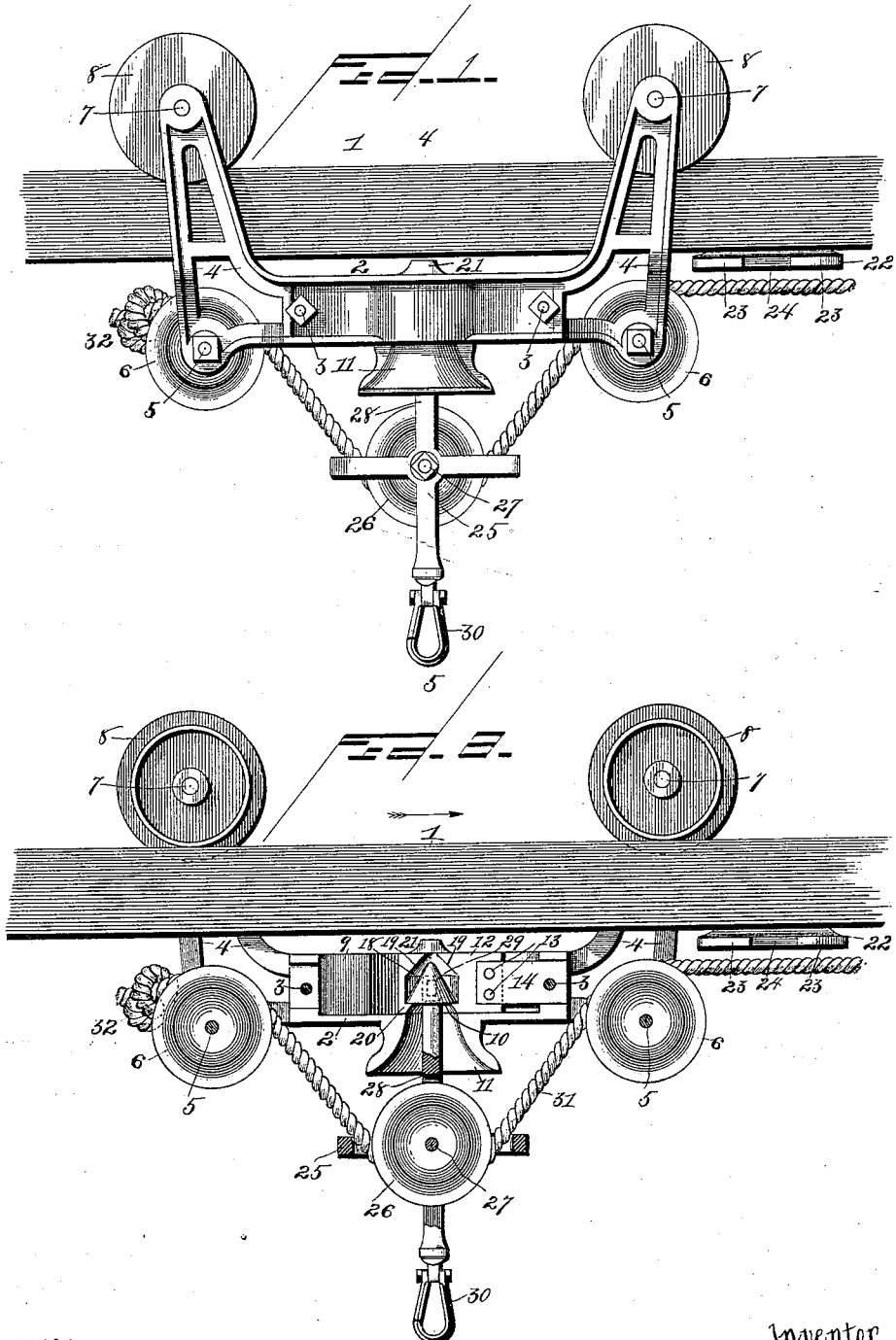

UNITED STATES PATENT OFFICE.

JAMES G. STOWE, OF KANSAS CITY, MISSOURI, ASSIGNOR TO THE SOUTH-WESTERN SUPPLY COMPANY, OF SAME PLACE.

HAY-CARRIER.

SPECIFICATION forming part of Letters Patent No. 463,876, dated November 24, 1891.

Application filed March 7, 1891. Serial No. 384,086. (No model.)

*To all whom it may concern:*

Be it known that I, JAMES G. STOWE, of Kansas City, Jackson county, Missouri, have invented certain new and useful Improvements in Hay-Carriers, of which the following is a full, clear, and exact description, reference being had to the accompanying drawings, forming a part hereof.

My invention relates to appliances for transferring hay and other bulky or heavy commodities from the vehicle in which they have been transported to the structures or buildings in which they are to be stored.

The objects of my invention are to produce a hay-carrier which shall be simple, compact, and durable in construction, and also to produce a hay-carrier which shall be capable of being operated in opposite directions without necessitating any reversal of its parts.

A still further object of my invention is to produce a hay-carrier the frame-work of which shall be so constructed as to enable the machine to be easily and quickly put together and taken apart, and so, also, as to greatly decrease the number of parts of the carrier.

To the above purposes my invention consists in certain peculiar and novel features of construction and arrangements, as hereinafter described, and pointed out in the appended claims.

In order that my invention may be fully understood, I will proceed to describe it with reference to the accompanying drawings, in which—

Figure 1 is a side elevation of my improved hay-carrier in operative position upon a supporting beam or rail. Fig. 2 is a similar view of the same, but with one-half of the body portion of the carrier removed. Fig. 3 is a plan view of the carrier removed from its rail and showing the gripping-jaws in closed position. Fig. 4 is a transverse vertical section of the hay-carrier on the line 4 5 of Fig. 1, the gripping-jaws being shown as closed to retain the locking-head. Fig. 5 is a similar view of the same, also upon the line 4 5 of Fig. 1, and showing the locking-head in raised position to open the gripping-jaws. Fig. 6 is an under side view of a portion of the beam or rail with the trip-plate in position thereon. Fig. 7 is a detached perspective view of one of the gripping-jaws and its retaining-spring. Fig. 8 is a plan view of a portion of the carrier, showing the gripping-jaws in open position.

In the said drawings, 1 designates a beam or rail, which is suitably secured in horizontal position in a barn or other building in which the hay or other commodity is to be stored, and upon this beam or rail the carrier, to be hereinafter described, is supported and caused to travel so as to carry the hay or other commodity from a vehicle to a place of storage, or vice versa. The body portion of the carrier is formed of two longitudinal portions or halves 2, each of which extends through the entire length of the carrier-body, and which are connected together at their ends by bolts 3, one of which is located at each end of the body portion and each of which extends transversely through the said body portion. At each end each of these body-sections 2 is formed with an outwardly and upwardly extending arm 4, preferably of open or skeleton form, as shown. Each of these arms 4 is of approximately L shape, and they are disposed in two pairs, one pair at each end of the body portion of the carrier. Each pair of these arms is connected together by a bolt 5, which extends transversely of the carrier-body, and the two bolts thus serve also to connect the two sections of the carrier-body securely together. The two bolts 5 just described serve also as pins or axles of two sheaves 6, the purpose of which will be hereinafter explained, and which are thus located one at each end of the carrier-body. Through the upper end of each arm 4 extends a pin 7, which constitutes the axle of a flanged wheel 8. There are thus four of these wheels 8, each of which is mounted adjacent to the inner side of the upper end of each arm or standard 4, and these wheels rest and travel in pairs at each end of the carrier and upon the upper side of the beam or rail 1. The flanges of the wheels 8 bear against the outer side of said beam or rail, and the said wheels serve to support and carry the carrier-body.

The upper side of the carrier-body is formed with a cavity 9, which is of approximately diamond or lozenge shape and one-half of which is formed in each section 2 of the carrier-body. In the center of each cavity 9 is formed an opening 10, preferably circular in form, and which is formed half in each section 2 of the carrier-body. On the under side of the carrier-body is formed a pendent bell-mouth or flared guide 11, the upper open end of which registers with the aperture 10 in the bottom of the cavity 9. This bell-mouth or guide is also formed in two parts or sections, each of which forms an integral part of one of the carrier-body sections.

Within the cavity 9 of the carrier-body are located two gripping-jaws 12, each of which is of hollow semispherical form, and which are placed opposite each other with their cavities adjacent. At one side each of these gripping-jaws is formed with a lug or offset 13, and when the gripping-jaws are arranged in proper operative position in the cavity 9 the two lugs or offsets 13 extend opposite from each other and longitudinally of the carrier-body. To the inner side of each of these offsets or lugs 13 is attached by rivets $13^a$ or equivalent means the inner end of a plate-spring 14. The outer ends of these springs are each formed with a hole 15, through which holes pass the bolts 3, which also connect the carrier-body sections together, as above described. The springs 14 thus extend oppositely from each other within the cavity 9 of the carrier-body, and their pressure is exerted to retain the adjacent sides of the grippers together, and thus the springs 14 serve to retain the grippers 12 normally in closed position. Two guide-plates 16 extend inwardly from the side walls of the cavity 9, each of said plates being at its outer end suitably secured to or formed upon the wall of the cavity 9 midway of the length of the same. These guide-plates thus extend transversely of the carrier-body and at their inner portions enter openings 17, one of which is formed in the body of each gripping-jaw, as is shown in Fig. 7. The principal function of these plates 16 is to support the gripping-jaws, and thus assist them to sustain the weight of the load, and this is accomplished by the grippers resting at the upper ends of their openings 17 upon the upper edges of the plate 16. By virtue of this arrangement all direct weight is entirely removed from the springs 14, and the latter are so arranged as to exert their full effective action upon the grippers entirely independent of the load which the grippers may be supporting. It will furthermore be seen that the springs are entirely inclosed within the body of the carrier, and hence there can be no danger of injury of the springs by collision with external objects. This peculiar arrangement of the springs and their described form as well add materially to the strength and compactness of the carrier as a whole.

The cavity 18 of each of the gripper-jaws 12 is approximately conical in form, the upper end or wall 19 of the cavity being upwardly and inwardly inclined toward the center of the cavity and an opening is left at the top thereof. At the bottom of the cavity is formed in each jaw a semicircular horizontal shoulder 20. The upper end of each jaw 12 is furthermore formed with an upwardly-extending lug 21, preferably convex on its inner side and rising from the outer edge of each jaw, the said lugs thus being opposite from each other.

Upon the under side of the rail or beam 1 is secured by screws $22^a$ or equivalent means one or more trip-plates 22. (See Figs. 1 and 6.) Each of these trip-plates is of oblong form and is pointed or contracted at its ends, so as to form outwardly-curved bearing-edges 23, converging at each end of the plate and diverging toward the middle thereof. There are thus two of these curved edges at each end of the trip-plate, and the inner rear ends of the curved edges at each side of said plates are separated from each other by a recess 24, there being thus one such recess on each side of the trip-plate midway of the length of the same.

25 designates a skeleton frame, within which is placed a sheave or pulley 26, said pulley or sheave being centered on a pin or axle 27, extending transversely through the middle of the frame 25. At the upper end of this frame 25 is formed or secured a rod or arm 28, the upper end of which carries a head 29, preferably of conical or equivalent shape—that is to say, the said head tapers inwardly from its lower toward its upper end. At the lower end of the frame 25 is attached a shackle 30 or an equivalent device for detachably connecting a hay-fork or other device for receiving the load.

31 designates a rope, which is led over the two pulleys or sheaves 6 and beneath the pulley or sheave 26, and which at each end is formed or provided with a knot 32, or an equivalent enlargement.

The operation of the above-described structure is as follows: Assume the parts to be in the position shown in Figs. 1, 2, and 3, and that a quantity of hay or other material is being carried by the carrier, and that the latter is being moved in the direction indicated by the arrow in Fig. 2 by a draft-animal or other power connected to the right-hand end of the rope 31. Now when the carrier reaches the trip-plate 22 the lugs 21 of the jaws 12 will be engaged by the curved edges 23 of the trip-plate 22 and the said grip-jaws will be separated so as to release the head 29 from the carrier. At the moment that the carrier approaches the trip-plate the rope 31 is slackened and the carrier is allowed to progress by momentum, so that when the head 29 is released it drops from the carrier. The momentum of the carrier causes the lug to ride over the curved edges 23 at this end of the trip-plate, and as soon as the lugs 21 come into line with the recesses of the trip-plate they are forced into said recesses, thus stopping and retaining the carrier. After the load has been delivered the power is again applied to the rope 31, drawing the head 29 forcibly upward past the shoulders 20 of the grip-jaws and against the inclined tops 19 of the cavities of the same. This latter impact opens the jaws and retains them open, whereby the lugs 21 are forced out of the recesses 24 of the trip-plate, allowing the carrier to be drawn away from the same. When the movement of the carrier is to be in the opposite direction from that described above, the left hand of the rope 31 is drawn through and attached to the animal or connected to the power of any sort and the operations are similar to that above described.

From the above it will be seen that I have produced a simple, compact, strong, and durable carrier, which is composed of but few parts, and the most delicate parts of which are protected against injury. It will be further seen that in reversing the movement of the carrier no transformation or reversal of its parts is required.

Having thus described my invention, what I claim as new therein, and desire to secure by Letters Patent, is—

1. An improved hay-carrier comprising a body portion composed of separate longitudinal half-sections and having a divided cavity formed in the upper side of the body portion, a pair of oppositely-disposed inwardly-extending plates formed upon the sides of the cavity, a pair of gripping-jaws mounted loosely and horizontally in the cavity and having each a recess to receive one of the supporting-plates and provided, also, each on its upper side with an upwardly-extending lug protruding out of the cavity and designed to engage a trip-plate, and a pair of longitudinally-disposed retaining-springs, each secured at its outer end between the end portions of the body-sections and at its inner end to one of the gripping-jaws, substantially as set forth.

2. An improved trip-plate for hay-carriers of the kind described, comprising an elongated plate having at each end an oppositely-disposed pair of curved and endwise-convergent external guide-surfaces, and at each side, midway of the length thereof, a recess dividing or separating said guide-surfaces, substantially as set forth.

3. An improved hay-carrier comprising a body portion composed of separate longitudinal half-sections and having a divided cavity on its upper side, oppositely-disposed supporting-plates projecting inwardly from opposite sides of the cavity, and spring-retained gripping-jaws located wholly within said cavity and having each at one side an opening to receive one of said plates and supported upon said plates by the upper margins of their openings, substantially as set forth.

In testimony whereof I affix my signature in presence of two witnesses.

JAMES G. STOWE.

Witnesses:
   JNO. L. CONDRON,
   G. Y. THORPE.